United States Patent
Brannon

(10) Patent No.: US 10,341,092 B2
(45) Date of Patent: Jul. 2, 2019

(54) APPLICATION SPECIFIC CERTIFICATE MANAGEMENT

(71) Applicant: VMware, Inc., Palo Alto, CA (US)

(72) Inventor: Jonathan Blake Brannon, Mableton, GA (US)

(73) Assignee: VMware, Inc., Palo Alto, CA (US)

( * ) Notice: Subject to any disclaimer, the term of this patent is extended or adjusted under 35 U.S.C. 154(b) by 44 days.

(21) Appl. No.: 15/594,806

(22) Filed: May 15, 2017

(65) Prior Publication Data

US 2017/0250807 A1    Aug. 31, 2017

Related U.S. Application Data

(62) Division of application No. 14/282,034, filed on May 20, 2014, now Pat. No. 9,654,463.

(51) Int. Cl.

| | |
|---|---|
| *G06F 21/00* | (2013.01) |
| *H04L 9/08* | (2006.01) |
| *H04L 29/06* | (2006.01) |
| *G06F 21/33* | (2013.01) |
| *G06F 21/60* | (2013.01) |
| *H04L 9/32* | (2006.01) |
| *H04L 9/00* | (2006.01) |
| *G06F 15/16* | (2006.01) |

(52) U.S. Cl.
CPC .......... *H04L 9/0822* (2013.01); *G06F 21/335* (2013.01); *G06F 21/606* (2013.01); *H04L 9/006* (2013.01); *H04L 9/0825* (2013.01); *H04L 9/3268* (2013.01); *H04L 29/06775* (2013.01); *H04L 63/0823* (2013.01); *G06F 15/16* (2013.01); *G06F 21/33* (2013.01)

(58) Field of Classification Search
CPC ...... G06F 21/33; G06F 21/335; G06F 21/606; H04L 9/0816; H04L 9/0819; H04L 9/0825; H04L 9/0861; H04L 9/3268
See application file for complete search history.

(56) References Cited

U.S. PATENT DOCUMENTS

| | | | |
|---|---|---|---|
| 2002/0126850 A1* | 9/2002 | Allen ................... | H04L 9/0825 380/277 |
| 2004/0123104 A1* | 6/2004 | Boyen .................. | G06F 21/602 713/165 |
| 2004/0133774 A1 | 7/2004 | Callas | |
| 2007/0234047 A1 | 10/2007 | Miyazawa | |

* cited by examiner

*Primary Examiner* — Edward Zee
(74) *Attorney, Agent, or Firm* — Clayton, McKay & Bailey, PC

(57) ABSTRACT

Application specific certificate deployment may be provided. An application may generate a security certificate comprising a public key and a first private key. The public key may be stored in a shared segment of a memory store, from where it may be retrieved and signed. The signed public key may be re-deployed and/or used to transmit securely encrypted resources.

16 Claims, 5 Drawing Sheets

APPLICATION SPECIFIC CERTIFICATE MANAGEMENT

This patent application is a divisional of U.S. patent application Ser. No. 14/282,034 ("Application Specific Certificate Management"), filed May 20, 2014, which is expressly incorporated by reference. This patent application claims the benefit of priority to U.S. patent application Ser. No. 14/282,034.

BACKGROUND

Mobile device management often relies on utilizing existing mechanisms to add enhanced levels of security. For example, applications installed on a device may need to securely access enterprise resources and data despite those applications not having established means for doing so. A virtual private network (VPN) may sometimes be established to provide secure communication, but this process can be difficult and resource intensive. Instead, existing channels of communication, such as may be provided by an existing operating system on the device, may be leveraged with other mechanisms, such as security certificates, to provide low-impact workarounds.

SUMMARY

This Summary is provided to introduce a selection of concepts in a simplified form that are further described below in the Detailed Description. This Summary is not intended to identify key features or essential features of the claimed subject matter. Neither is this Summary intended to be used to limit the claimed subject matter's scope.

Application specific certificate deployment may be provided. An application may generate a security certificate comprising a public key and a first private key. The public key may be stored in a shared segment of a memory store, from where it may be retrieved and signed. The signed public key may be re-deployed and/or used to transmit securely encrypted resources.

It is to be understood that both the foregoing general description and the following detailed description are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the detailed description.

BRIEF DESCRIPTION OF THE DRAWINGS

Many aspects of the present disclosure can be better understood with reference to the following diagrams. The drawings are not necessarily to scale. Instead, emphasis is placed upon clearly illustrating certain features of the disclosure. Moreover, in the drawings, like reference numerals designate corresponding parts throughout the several views. In the drawings.

DETAILED DESCRIPTION

Figure 1:
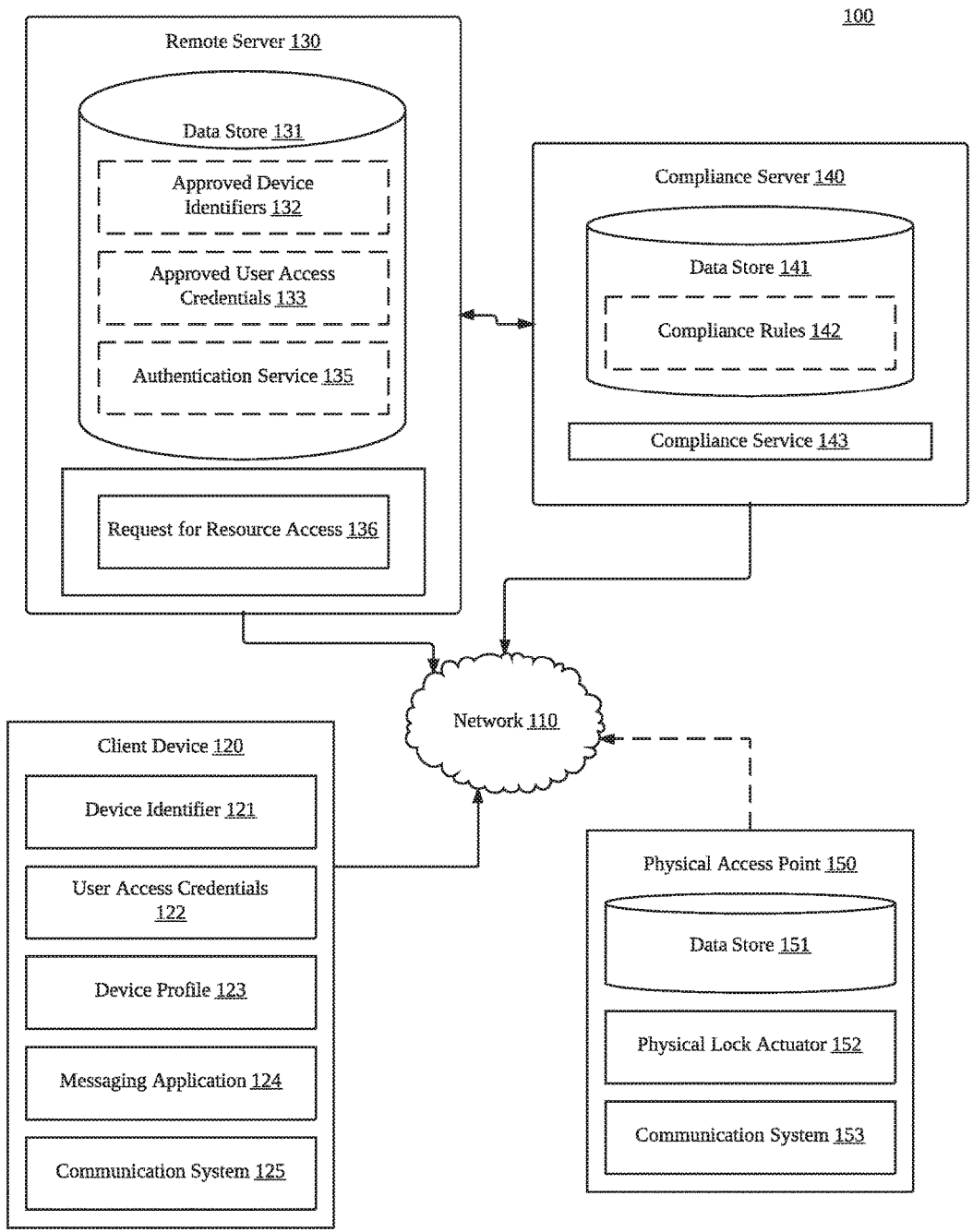
FIG. 1 is a block diagram of an operating environment for providing device management.

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Users of mobile devices often need to securely access resources and/or data associated with an organization or enterprise. For example, a user may wish to access a shared file folder hosted on a corporate intranet. In some cases, specific configurations, such as a VPN, may be needed to access these resources. In other cases, an application may be configured to receive encrypted copies of the resources. The application still needs a way to ensure that the encryption mechanism is not compromised, however, when accessing these resources over a public or non-secure channel.

Some mobile device operating systems, such as Apple's iOS® 7, offer configuration channels that may be used for communicating directly with an application executing on the device. These channels, however, are not encrypted, and may be shared among multiple applications. In order to provide an additional layer of security, the insecure communication channel may be used solely for communicating non-sensitive and/or encrypted information, such as the public key half of a security certificate or an encrypted private key. Since only the private key half of the security certificate is considered sensitive, the public key may be accessed by any other application or user without risk of compromising the secured data or resources.

The security certificate may be generated by the application wishing to access the resources, and the public key may be uploaded to the resource provider. The public key may then be used to encrypt the data. The encrypted data can then be provided to the application over the shared communication channel without risk of exposure, and the application may use the private key to decrypt the data.

In some embodiments, users, applications, and/or their devices may be required to comply with management and/or security policies in order to request resources, use certain features and/or to communicate with other users at all. For example, a device may need to comply with various security checks such as virus or malware scans, which applications and/or protocols may be used, operating system integrity (e.g., not be 'rooted', 'jailbroken', or otherwise hacked), and/or user, group, and/or device authorizations. Management policies may restrict factors such as times and/or locations in which such messages may be sent and/or received, a quota of resources that may be used by such messaging, who may exchange messages with whom, and/or which user preferences and/or settings may be enforceable.

Compliance with management and/or security policies may be required by an enterprise to prevent remediation actions from being taken. For example, a management policy may require that a device have a passcode set, that a specific application be used for real-time communications, and that only users within the same user group may be messaged during working hours. Security policies may restrict encryption of the message traffic to an encryption key assigned by the enterprise, so that messages may be logged and/or audited, and may prohibit the sending of files or images. Failure to comply with these policies may result, for example, in restricting an input from being transmitted at all, overriding a user preference associated with the application (e.g., using the enterprise encryption key instead of a personal key), and/or preventing the establishment of a communication session between the users at all.

The security policies may further comprise requirements to protect the content of the communication from unauthorized users. For example, a notification message on the receiving user's device may be prohibited from displaying any and/or all of the contents of the communication until an authorization, such as a passcode or encryption key password, has been entered. In some embodiments, the message may be displayed, but the contents may be obfuscated, such as by blurring or covering text with black boxes. Other restrictions may prevent any and/or all devices participating in the communication from capturing the contents of the message, such as by preventing logging and/or disabling screen capture capabilities. A further refinement may vary a refresh rate associated with different portions of a display of the contents such that attempts to photograph the screen may be blocked or at least allowed to capture only portions of those contents.

The technical effects of some embodiments of this disclosure may include establishing control of access to networks and resources for user devices when access lists may not be predefined, and reducing and/or eliminating the burden of predefining access lists to control access to networks and resources. Moreover, the technical effects of some embodiments may include enhancing network access control by assigning specific access rights based on access lists to client devices authorized to access associated network beacons and resources.

Other technical effects of some embodiments of this disclosure may offer group management solutions to managing content access and distribution. For example, users of a sales group may have read access to marketing documents and presentations, while users in a marketing group may be able to edit and/or annotate the market documents. Similarly, users in an accounting or business services group may be the only ones with access to enterprise financial documents. These access controls may be provided by distributing authorization credentials to devices associated with users of the respective group. Each user may then authenticate to their device, such as by inputting a username, password, authentication key, and/or biometric data, before the device may access and/or retrieve the content authorized for distribution to that device. These authentication types are provided as examples only and are not intended to be limiting as many other types of user authentication are in use and/or may be contemplated in the future.

Content access may be further limited by policies that enforce other compliance restrictions based on properties of the device such as time, location, device security and/or integrity, presence of another device, software versions, required software, etc. For example, educational settings may designate student and instructor groups. These groups may be further assigned to specific classes such that only student group members associated with a given class may access content associated with that class. Further, edit access to the content for the class may be restricted to the user(s) in the instructor group and/or student group members may be permuted to add content that only the instructor may view (e.g., homework assignments.) In some embodiments, the instructor group user(s) may be able to push content to student group user(s) and/or activate temporary control of the students' devices to prevent the devices from accessing non-class related content during class time.

To reduce the cost of ownership of user devices and cellular and/or data service charges associated with use of such user devices, an enterprise such as an educational institution and/or a business may implement a "bring your own device" (BYOD) policy to allow an employee to use his/her personal device to access enterprise resources rather than provide the user with an enterprise owned user device for such purpose. To support such a BYOD policy, a user device administrator (i.e. IT administrator) may manage a group of personally owned user devices, via a management application executed by a management server in communication with the user devices over a network, to provide the user devices with secure access to enterprise resources.

The user device administrator may enroll user devices into the management system to monitor the user devices for security vulnerabilities and to configure the user devices for secure access to enterprise resources. The user device administrator may create and/or configure at least one configuration profile via a user interface provided by the management system. A configuration profile may comprise a set of instructions and/or settings that configure the operations and/or functions of a user device, which may ensure the security of the accessed resources. The user device administrator may, for instance, configure an enterprise email configuration profile by specifying the network address and access credentials of an enterprise email account that the users of the user devices are authorized to access. Other configuration policies may include, but are not limited to, hardware, software, application, function, cellular, text message, and data use restrictions, which may be based at least in part on the current time and/or location of the restricted user device. The user device administrator may thereafter deploy the configuration profiles to specific user devices, such as to groups of user devices of users with similar roles, privileges and/or titles.

Access credentials may uniquely identify a client device and/or the user of the client device. For example, the access credentials for a user may comprise a username, a password, and/or biometric data related to facial recognition, retina recognition, fingerprint recognition, and the like. Access credentials related to a device may uniquely identify the device and may comprise, for example, a unique hardware identifier such as a GUI© (Globally Unique identifier), UUID (Universally Unique Identifier), UDID (Unique Device Identifier), serial number, IMEI (Internationally Mobile Equipment Identity), Wi-Fi MAC (Media Access Control) address, Bluetooth MAC address, a CPU ID, and/or the like, or any combination of two or more such hardware identifiers. Additionally, the access credentials may be represented by a unique software identifier such a token or certificate, based at least in part on the aforementioned unique hardware identifiers.

The user devices may also have access to personal configuration profiles that may be created by the users of the user devices. The user devices may, for instance, have access to a personal email configuration profile that was created by a user of the user device to provide access to her personal email account. Thus, a user device enrolled in a BYOD management system may have more than one configuration profile for a given use of the user device, such as a personal email configuration profile and an enterprise email configuration profile that are both used for accessing email accounts on the user device.

The user devices may be instructed to enable and/or disable certain configuration profiles according to authorization rights specified by the user device administrator, such as location and/or time-based authorization rights. For example, a BYOD policy may specify that user devices enrolled in the BYOD management system are authorized for personal use outside of the workday and are authorized for business use during the workday. Similarly, a BYOD device may be restricted to enterprise uses while in work locations and/or prohibited from accessing enterprise resources while outside of secure work locations. To implement such a policy, a user device administrator may instruct the user devices to toggle between personal configuration policies and enterprise configuration policies based on factors such as the current time and/or location associated with the user device.

The current time may be based on the current time at the current location of the user device, which may be determined by GPS, Wi-Fi, Cellular Triangulation, etc., or may be based on the current time at a configured primary location associated with the user device, which may be the primary office location of an employee user of the user device. As an example, time-based configuration profile toggling may be provided by instructing a user device to enable business configuration profiles and disable personal configuration profiles while the current time is between 9 AM and 5 PM at the current location of the user device, and to disable business configuration profiles and enable personal configuration profiles while the current time is between 5 PM and 9 AM at the current location of the user device.

FIG. 1 illustrates a networked environment 100 according to various embodiments. The networked environment 100 includes a network 110, a client device 120, a remote server 130, a compliance server 140, and a physical access point 150. The network 110 includes, for example any type of wireless network such as a wireless local area network (WLAN), a wireless wide area network (WWAN), and/or any other type of wireless network now known and/or later developed. Additionally, the network 110 includes the Internet, intranets, extranets, microwave networks, satellite communications, cellular systems, PCS, infrared communications, global area networks, and/or other suitable networks, etc., and/or any combination of two or more such networks. It should be understood that embodiments described herein may be used to advantage in any type or combination of wired and/or wireless networks.

In some embodiments, the network 110 facilitates the transport of data between at least one client device, such as client device 120, the remote server 130, the compliance server 140, and the physical access point 150. Client devices may include a laptop computer, a personal digital assistant, a cellular telephone, a set-top device, music players, web pads, tablet computer systems, game consoles, and/or other devices with like capability. Client device 120 comprises a wireless network connectivity component, for example, a PCI (Peripheral Component Interconnect) card, USB (Universal Serial Bus), PCMCIA (Personal Computer Memory Card International Association) card, SDI© (Secure Digital Input-Output) card, NewCard, Cardbus, a modem, a wireless radio transceiver (including an RFID transceiver), near-field communications (NFC) transceiver, and/or the like. Additionally, the client device 120 may include a processor for executing applications and/or services, and a memory accessible by the processor to store data and other information.

The client device 120 is operable to communicate wirelessly with the remote server 130 and the physical access point 150 with the aid of the wireless network connectivity component.

Additionally, the client device 120 may store in memory a device identifier 121, user access credentials 122, a device profile 123, and potentially other data. In some embodiments, the device identifier 121 may include a software identifier, a hardware identifier, and/or a combination of software and hardware identifiers. For instance, the device identifier 121 may be a unique hardware identifier such as a MAC address, a CPU ID, and/or other hardware identifiers. The user access credentials 122 may include a username, a password, and/or biometric data related to facial recognition, retina recognition, fingerprint recognition, and the like. Additionally, the device profile 123 may include a listing of hardware and software attributes that describe the client device 120. For instance, the device profile 123 may include hardware specifications of the client device 120, version information of various software installed on the client device 120, and/or any other hardware/software attributes. Additionally, the device profile 123 may also include data indicating a date of last virus scan, a date of last access by IT, a date of last tune-up by IT, and/or any other data indicating a date of last device check.

The client device 120 may further be configured to execute various applications such as an "messaging application" 124. The messaging application 124 may be executed to exchange real-time communications with other client devices. Communication system 125 may be the same or different than the wireless network connectivity component previously discussed, include the same or different communication abilities, and may at least be specifically able to communicate with physical access points 150, discussed below.

The client device 120 may also be configured to execute other applications such as, for example, browser applications, email applications, physical access applications, word processing applications, spreadsheet applications, database applications, and/or other applications. For instance, a browser and/or word processing application may be executed in the client device 120, for example, to access and render network pages, such as web pages, documents, and/or other network content served up by remote server 130, the compliance server 140, and/or any other computing system.

The remote server 130 and the compliance server 140 can each be implemented as, for example, a server computer and/or any other system capable of providing computing capability. Further, the remote server 130, compliance server 140, and any other system described herein may be configured with logic for performing the methods described in this disclosure. Although one remote server 130 and one compliance server 140 are depicted in FIG. 1, certain embodiments of the networked environment 100 include more than one remote server 130 and/or compliance server 140. At least one of the servers may be employed and arranged, for example, in at least one server bank, computer bank, and/or other arrangements. For example, the server computers together may include a cloud computing resource, a grid computing resource, and/or any other distributed computing arrangement. Such server computers may be located in a single installation and/or may be distributed among many different geographical locations. For purposes of convenience, the remote server 130 and the compliance server 140 are each referred to herein in the singular.

Various applications and/or other functionality may be executed in the remote server 130 and the compliance server 140, respectively, according to certain embodiments. Also, various data is stored in a data store 131 that is part of and/or otherwise accessible to the remote server 130 and/or a data store 141 that is part of and/or otherwise accessible to the compliance server 140. The data stored in each of the data stores 131 and 141, for example, may be accessed, modified, removed, and/or otherwise manipulated in association with the operation of the applications and/or functional entities described herein.

The components executed in the remote server 130 include an authentication service 135, and may include other applications, services, processes, systems, engines, and/or functionality not discussed in detail herein. As used herein, the term "authentication service" is meant to generally refer to computer-executable instructions for performing the functionality described herein for authorizing and authenticating client device 120. The authentication service 135 is executed to receive a request for access to resources 136 from an application executed on client device 120 and to determine whether to grant or deny the request 136. Upon determining to grant the request 136, the authentication service 135 may then send access credentials.

The data stored in the data store 131 of the remote server 130 may include, for example, approved device identifiers 132, approved user access credentials 133, physical access credentials, resource access credentials, and potentially other data. The approved device identifiers 132 represents a listing of device identifiers 121 that have been pre-approved for potential accessing physical access credentials 134 which may entitle holders of client devices 120 to access to various resources. The approved device identifiers 132 may have been previously provided to the remote server 130 by a system administrator and/or the like. The approved user access credentials 133 represents a listing of user access credentials 122 that have been pre-approved for potential accessing resource credentials.

The components executed in the compliance server 140 include a compliance service 143, and may include other applications, services, processes, systems, engines, and/or functionality not discussed in detail herein. As used herein, the term "compliance service" is meant to generally refer to computer-executable instructions for performing the functionality described herein for authorizing the device characteristics of another device, such as client device 120. The compliance service 143 is executed to determine whether the device characteristics of the client device 120 comply with the compliance rules 142 that are stored in the data store 141. For instance, the compliance service 143 may identify the device characteristics from the device profile 123 of each client device 120. Additionally, the compliance rules 142 represents a listing of management and security policies, hardware restrictions, software restrictions, and/or mobile device management restrictions that may need to be satisfied by the client device 120 prior to granting the request for resource access 136.

In some embodiments, hardware restrictions included in the compliance rules 142 may comprise restrictions regarding use of specific client devices 120 and specific client device features, such as, for instance, cameras, Bluetooth, IRDA, tethering, external storage, a mobile access point, and/or other hardware restrictions. Software restrictions included in the compliance rules 142 may comprise restrictions regarding the use of specific client device operating systems and/or other applications 125, internet browser restrictions, screen capture functionality, and/or other software restrictions. Mobile device management restrictions included in the compliance rules 142 comprise encryption requirements, firmware versions, remote lock and wipe functionalities, logging and reporting features, GPS tracking, and/or other mobile device management features.

The compliance service 143 may determine whether the device characteristics of a client device 120 satisfy at least one of the restrictions enumerated in the compliance rules 142. For example, the compliance service 143 may determine that a client device 120 that has a camera, Bluetooth capability, and is executing a specified version of an operating system is compliant with the compliance rules 142. As another example, the compliance service 143 may determine that a client device 120 that is associated with an external storage unit and has screen capture functionality enabled is not compliant with the compliance rules 142. All of these restrictions discussed above may affect whether the client device 120 is entitled to use a given resource(s). In some embodiments, however, the compliance service 143 may not be used and physical access authorization may be determined solely based on approved user access credentials 133 and/or approved device identifiers 132.

A user operating a client device 120 may wish to receive at least one resource(s) so that the user may physical access a building, location, door, gate, drawer, filing cabinet, storage unit, cabinet, etc. In some embodiments, the user may interact with an input device to manipulate a network page displayed by a locally executed application, such as a browser application, to generate the request for resource access 136. In some embodiments, the user may manipulate a user interface generated by a locally executed application to generate the request 136. In either case, the user may provide login information and/or the application may automatically retrieve the login information from the memory of the client device 120. Login information may be, for instance, a unique user name, a password, biometric data, and/or other types of user access credentials 122. The application may then communicate the request to the enterprise access application 124, which may generate and transmit the request 136 to the authentication service 135. In some embodiments, the enterprise access application 124 may itself receive the input from the user directly and then transmit the access request 136 to the remote server 130.

Upon receiving the request 136, the authentication service 135 determines whether to grant or deny the request 136. In some embodiments, the authentication service 135 may first authenticate the client device 120 and the user operating the client device 120. To this end, the authentication service 135 determines whether the device identifier 121 associated with the client device 120 matches one of the identifiers listed in the listing of approved identifiers 132. For instance, the device identifier 121 of the client device 120 may be included as part of the request 136 transmitted by the enterprise access application 124. In some embodiments, the authentication service 135 may request the device identifier 121 from the client device 120 in response to receiving the access request 136. Upon identifying and/or receiving the device identifier 121, the authentication service 135 determines whether the device identifier 121 matches one of the approved identifiers 132 stored in the data store 131. In some embodiments, the authentication service 135 may authenticate the client device 120 dynamically by determining whether the device identifier 121 is within a predetermined range of approved device identifiers 132. In some embodiments, the authentication service 135 may authenticate the client device 120 dynamically by performing an algorithm on the device identifier 121.

Additionally, the authentication service 135 may also authenticate the user operating the client device 120 by determining whether the user access credentials 122 associated with the user match one of the credentials in the listing of approved user access credentials 133. For instance, the user access credentials 122 associated with the user on the client device 120 may be included as part of the access request 136 transmitted by the enterprise access application 124. In some embodiments, the authentication service 135 may request the user access credentials 122 from the client device 120 in response to receiving the access request 136. Upon identifying and/or requesting the user access credentials 122, the authentication service 135 may determine whether the user access credentials 122 matches one of the approved user access credentials 133 stored in the data store 131. In some embodiments, the authentication service 135 may authenticate the user operating the client device 120 without also authenticating the client device 120. In other words, certain authenticated users may be authorized to gain the requested physical access regardless of what device they used to submit the resource request 136.

In some embodiments, having authenticated the client device 120 and the user operating the client device 120 as authorized to receive the resource(s), the authentication service 135 communicates with the compliance service 143 to further authorize the client device 120 to receive the resource(s). In some embodiments, the compliance service 143 authorizes the client device 120 by determining whether device characteristics of the client device 120 comply with applicable compliance rules 142. For instance, the compliance service 143 may identify the device characteristics of the client device 120 from the device profile 123. All or part of the device profile 123 may have been provided by the client device 120 in conjunction with the request 136 and/or may be subsequently requested from the client device 120 by the authentication service 135 and/or the compliance service 143. The compliance service 143 then analyzes the device characteristics to determine whether the software restrictions, hardware restrictions, and/or device management restrictions defined in the compliance rules 142 are satisfied and returns the result of the determination to the authentication service 135. In an alternative embodiment, the authentication service 135 may include and perform functionality for determining whether the client device 120 complies with the compliance rules 143.

If the authentication service 135 determines and/or receives a determination that the client device 120 is authorized, the authentication service 135 then associates the client device 120 with at least one resource(s). In some embodiments, the authentication service 135 sends the physical access credentials 134 to the client device 120 and authorizes the client device 120 to use such credentials in connection with accessing physical access points 150. In some embodiments, the authentication service 135 may also send the physical access credentials to physical access point 150.

In some embodiments, the resource(s) may be revoked at any time by the remote server 130. Revocation may occur for any number of reasons, including but not limited to, a change in device profile 123, a change in approved device identifiers 132, a change in approved user access credentials 133, expiration of a defined time period, and/or a request from the user of the client device 120.

In some embodiments, the physical access point 150 is an electro-mechanical device capable of sending and/or receiving information, and in response thereto opening a physical barrier, for example a building, location, door, gate, drawer, filing cabinet, storage unit, cabinet, etc. Depending on the embodiment, the physical access point may or may not be in communication with network 110 and servers and devices connected therewith. In these embodiments, the physical access point may have authorized physical access credentials 134 embedded and/or stored therein, either in a ROM-type storage unit, and/or in a non-networked RAM-type storage unit. A non-networked RAM-type storage unit could be updated locally by direct connection via USB and/or the like, with additional security mechanisms to prevent unwanted tampering/changing of the embedded/stored physical access credentials 134.

The physical access point 150 may include a data store 151 for maintaining data and/or applications which relate to determining whether a client device 120 may be allowed access by the physical access point 150. In some embodiments, the data store 151 may only include a single access code and/or datum that is expected to be matched by any client device 120 providing the same, thereby entitling the client device 120 to access beyond the physical barrier. In some embodiments, the data store 151 may include a plurality of access codes, any of which may be matched by a client device 120 to verify authority to access beyond the physical barrier. The physical access point may have a processor to implement such methods.

The physical access point 150 may also include a physical lock actuator 152, for example, a solenoid and/or other electro-mechanical actuator, which is operable to physically unlock the physical barrier upon command to do so by the physical access point 150. The physical access point may also include a communication system 153 for sending and receiving information with a client device 120 (for example, an RFID transceiver, a wireless radio transceiver, a near field communication device, and/or the like).

Figure 2:
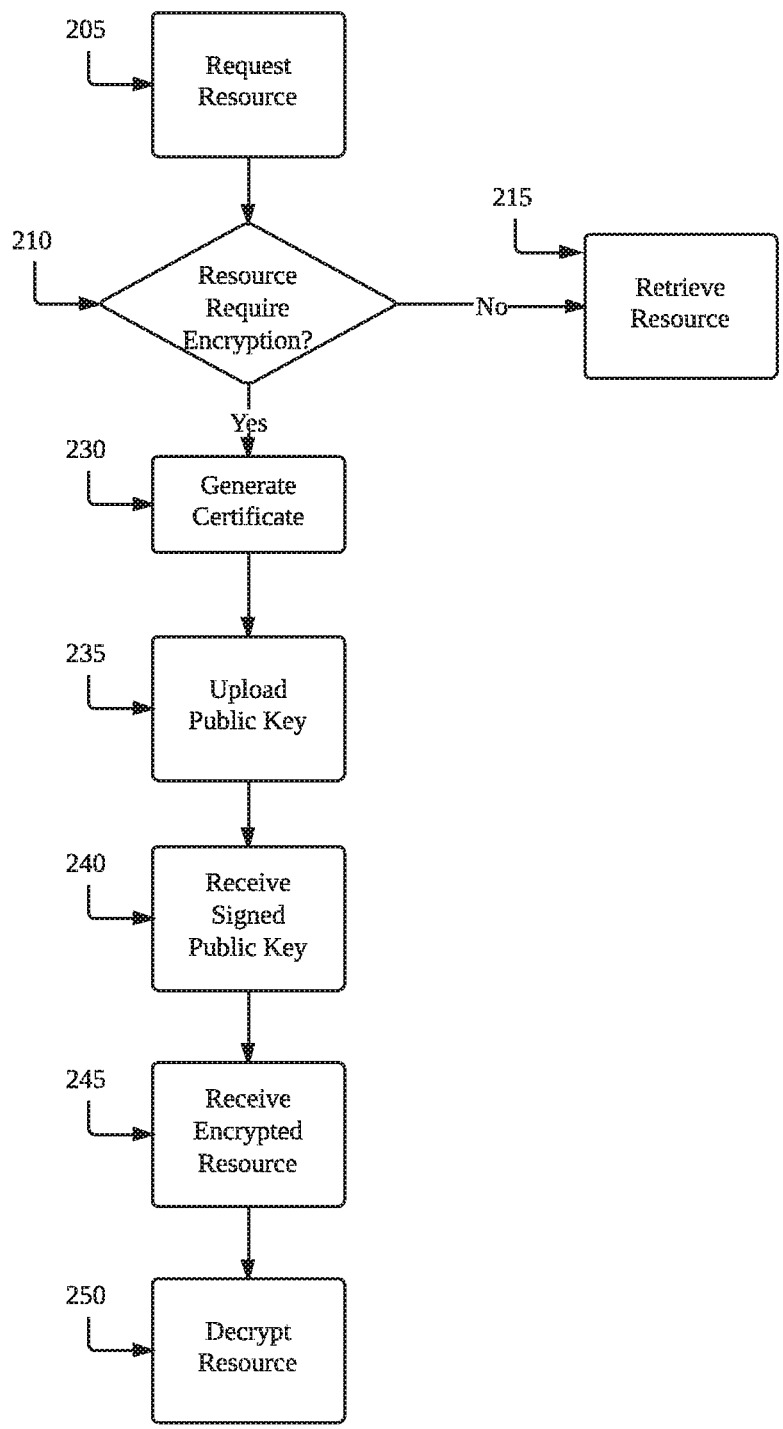
FIG. 2 is a flow chart illustrating a method for providing application specific certificate deployment.

FIG. 2 is a flow chart setting forth the general stages involved in a method 300 consistent with embodiments of this disclosure for providing application specific certificate deployment. Method 200 may be implemented using elements of operating environment 100 as described above, a schematic block diagram 400 and a virtual desktop infrastructure (VDI) system 500, as described below. Method 200 is described below with respect to operations performed by a computing device, with the understanding that such a computing device may comprise any number devices programmed for operation of any and/or all of the steps of method 200. The described computing device may comprise, for example, client device 120, remote server 130, compliance server 140, and/or physical access point 150. Ways to implement the stages of method 200 will be described in greater detail below.

Method 200 may begin at stage 205 where a computing device may request access to a particular resource. For example, an application may attempt to retrieve a plurality of data, such as documents, web pages, emails, etc. and/or may attempt to execute commands on a remote system such as updating a database, copying or modifying remote files, performing remote procedure calls, etc.

Method 200 may then advance to stage 210 where the computing device may determine whether the resource(s) require a secure retrieval. For example, unencrypted access to the resource(s) may be prohibited.

If no secure retrieval is required, method 200 may then advance to stage 215 where the computing device may simply retrieve and/or access the requested resource(s). Otherwise, method 200 may advance to stage 230 where the computing device may generate a security certificate according to a public key cryptography algorithm. Such a certificate normally comprises a public key and a private key as well as a unique issuer identifier. The certificate may be generated by the application requesting the secured resource(s), by another application, and/or by the operating system executing on the mobile device. In some embodiments, the certificate may be generated by another device, such as by remote server 130.

Public-key cryptography, also known as asymmetric cryptography, is a class of cryptographic algorithms which require two separate keys, one of which is secret (or private) and one of which is public. Although different, the two parts of this key pair are mathematically linked. The public key may be used to encrypt data and/or to verify a digital signature; whereas the private key is used to decrypt ciphertext or to create a digital signature.

Public-key algorithms are based on mathematical problems which currently admit no efficient solution that are inherent in certain integer factorization, discrete logarithm, and elliptic curve relationships. It is computationally easy for a user to generate their own public and private key-pair and to use them for encryption and decryption. The strength lies in the fact that it is "impossible" (computationally unfeasible) for a properly generated private key to be determined from its corresponding public key.

Public-key algorithms are fundamental security ingredients in cryptosystems, applications and protocols. They underpin such Internet standards as Transport Layer Security (TLS), PGP, and GPG. Some public key algorithms provide key distribution and secrecy (e.g., Diffie-Hellman key exchange), some provide digital signatures (e.g., Digital Signature Algorithm), and some provide both (e.g., RSA).

A public key infrastructure (PKI) is a set of hardware, software, people, policies, and procedures needed to create, manage, distribute, use, store, and revoke digital certificates. In cryptography, a PKI is an arrangement that binds public keys with respective user identities by means of a certificate authority (CA). The user identity must be unique within each CA domain. The third-party validation authority (VA) can provide this information on behalf of CA. The binding is established through the registration and issuance process, which, depending on the assurance level of the binding, may be carried out by software at a CA or under human supervision. The PKI role that assures this binding is called the registration authority (RA), which ensures that the public key is bound to the individual to which it is assigned in a way that ensures non-repudiation.

After generating the certificate at stage 230, method 200 may advance to stage 235 where the computing device may upload the public key portion of the security certificate. For example, the public key may be placed in a shared memory portion, such as an application configuration channel, that may be used to communicate data across a network. This memory portion may be shared among multiple applications and/or may be dedicated and accessible only to a specific application. Another computing device, such as remote server 130, may retrieve the public key from the shared memory portion and/or may receive the public key as a transmission. The public key may then be verified and signed by a certificate authority. In some embodiments, the computing device, such as client device 120, associated with the public key may need to be verified to be in compliance with compliance rules 142 before the key may be signed.

Method 200 may then advance to stage 240 where the computing device may receive the signed public key. For example, a certificate authority may transmit the signed public key to client device 120. An operating system executing on client device 120 may place the signed public key in a memory segment accessible to the requesting application. In some embodiments, this memory segment may also be accessible to a plurality of other applications.

Method 200 may then advance to stage 245 where the computing device may retrieve the requested resource(s). For example, client device 120 may transmit a request to retrieve the resource(s) from remote server 130. Remote server 130 may encrypt the resource(s) according to the public key and transmit the encrypted resource(s) back to client device 120.

Method 200 may then advance to stage 250 where the computing device may decrypt and utilize the resource(s). For example, client device 120 may decrypt the encrypted resource(s) using the private key corresponding to the public key used during the encryption. The resource(s) may then be made available to the application for display, data processing and/or manipulation. Method 200 may then end.

In some embodiments, the security certificate may be shared among a plurality of applications, such as by placing the private key in a memory segment accessible only to a restricted list of applications. These applications may then request resources from remote server 130 and indicate a unique identifier of the signed security certificate in order to have the resources encrypted using the established public key. In some other embodiments, a new security certificate may be generated for each resource request.

Figure 3:
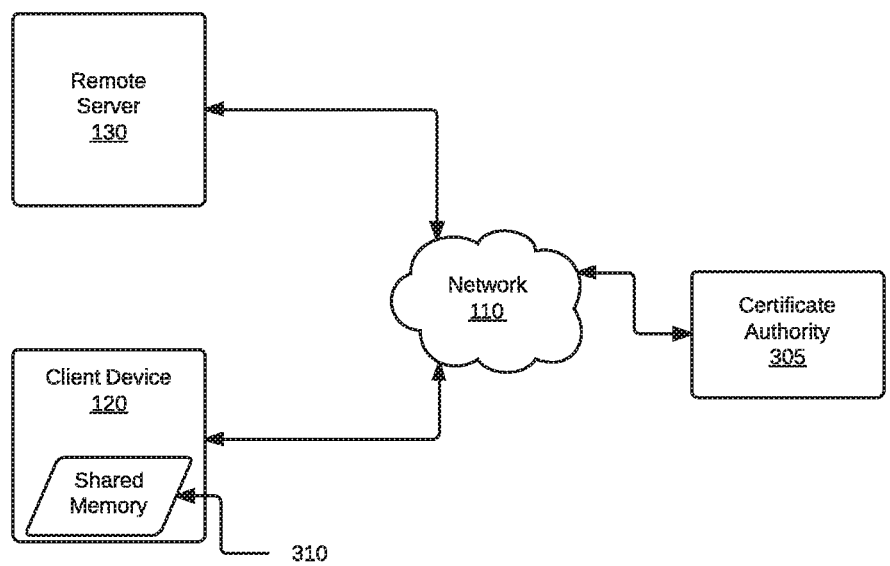
FIG. 3 is a block diagram of a communication system providing application specific certificate deployment.

FIG. 3 is a block diagram of a communication system 300 providing application specific certificate deployment. Communication system 300 may comprise client device 120, remote server 130, and a certificate authority 305. In cryptography, a certificate authority (CA) is an entity that issues digital certificates. The digital certificate certifies the ownership of a public key by the named subject of the certificate. This allows others (relying parties) to rely upon signatures or assertions made by the private key that corresponds to the public key that is certified. In this model of trust relationships, a CA is a trusted third party that is trusted by both the subject (owner) of the certificate and the party relying upon the certificate. CAs are characteristic of many public key infrastructure (PKI) schemes.

In some embodiments, a public key associated with a security certificate may be stored in a shared memory segment 310 associated with client device 120. The public key may be uploaded to remote server 130 via network 110, which may validate the compliance of client device 120 with any applicable security and/or management requirements. The key may then be sent to certificate authority 305 for verification and signing before being returned to client device 120. In some embodiments, client device 120 may communicate directly with certificate authority 305 without relaying the unsigned public key through remote server 130.

Figure 4:
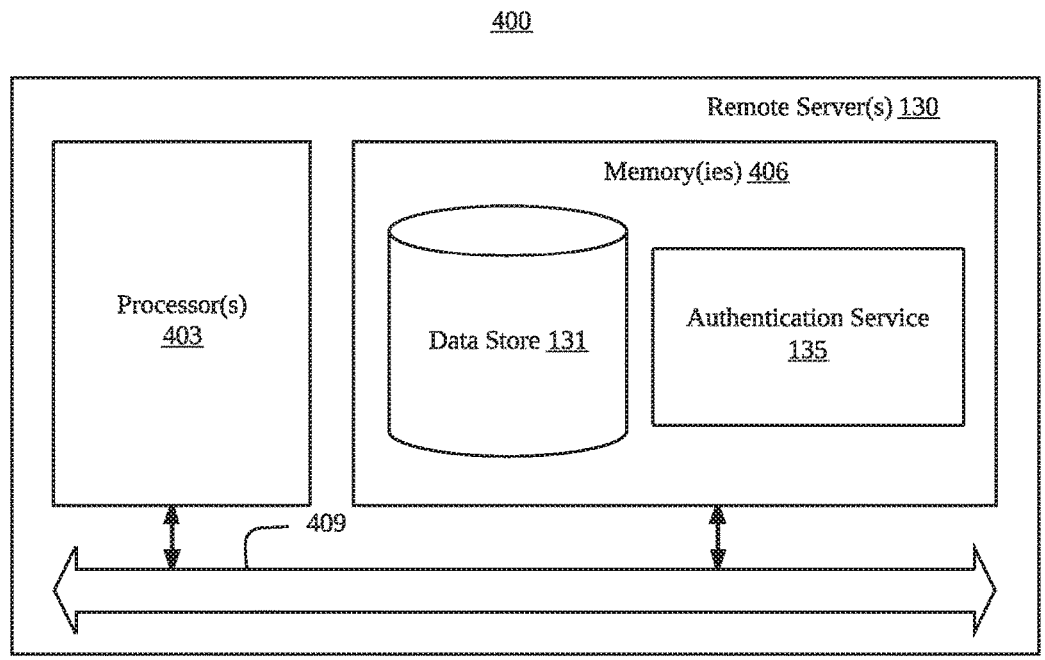
FIG. 4 is a schematic block diagram of a remote server and a client device.
Figure 4:
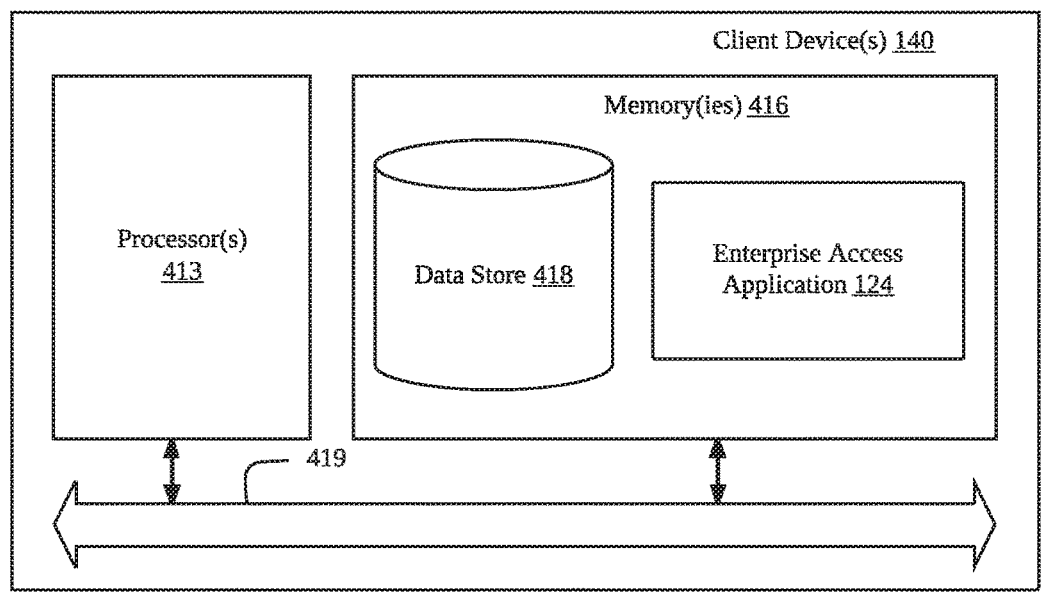

FIG. 4 illustrates schematic block diagram 400 of the remote server 130 and the client device 140 according to embodiments of the present disclosure. The remote server 130 includes at least one processor circuit, for example, having a processor 403 and a memory 406, both of which are coupled to a local interface 409. To this end, the remote server 130 may comprise, for example, at least one server computer and/or like device. Similarly, the client device 140 includes at least one processor circuit, for example, having a processor 413 and a memory 416, both of which are coupled to a local interface 419. Additionally, the client device 120 may be in data communication with a display for rendering user interfaces and at least one other I/O device for inputting and outputting data. To this end, the client device 140 may comprise, for example, at least one mobile wireless device, computer, and/or like device. The local interfaces 409 and 419 may comprise, for example, a data bus with an accompanying address/control bus and/or other bus structure as can be appreciated.

Stored in the memories 406 and 416 are both data and several components that are executable by the processors 403 and 413. In particular, stored in the memory 406/416 and executable by the processors 403 and 413 are a authentication service 135, an enterprise access application 124, and potentially other applications. Also stored in the memories 406 and 416 may be a data stores 131 and 418 and other data. In addition, an operating system may be stored in the memories 406 and 416 and executable by the processors 403 and 413.

It is to be understood that there may be other applications that are stored in the memories 406 and 416 and are executable by the processors 403 and 413 as can be appreciated. Where any component discussed herein is implemented in the form of software, any one of a number of programming languages may be employed such as, for example, C, C++, C#, Objective C, Java, JavaScript, Perl, PHP, Visual Basic, Python, Ruby, Delphi, Flash, and/or other programming languages.

A number of software components are stored in the memories 406 and 416 and are executable by the processors 403 and 413. In this respect, the term "executable" means a program file that is in a form that can ultimately be run by the processors 403 and 413. Examples of executable programs may be, for example, a compiled program that can be translated into machine code in a format that can be loaded into a random access portion of the memories 406 and 416 and run by the processors 403 and 413, source code that may be expressed in proper format such as object code that is capable of being loaded into a random access portion of the memory 406/416 and executed by the processors 403 and 413, and/or source code that may be interpreted by another executable program to generate instructions in a random access portion of the memories 406 and 416 to be executed by the processors 403 and 413, etc. An executable program may be stored in any portion and/or component of the memories 406 and 416 including, for example, random access memory (RAM), read-only memory (ROM), hard drive, solid-state drive, USB flash drive, memory card, optical disc such as compact disc (CD) and/or digital versatile disc (DVD), floppy disk, magnetic tape, and/or other memory components.

The memories 406 and 416 is defined herein as including both volatile and nonvolatile memory and data storage components. Volatile components are those that do not retain data values upon loss of power. Nonvolatile components are those that retain data upon a loss of power. Thus, the memories 406 and 416 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, and/or a combination of any two and/or more of these memory components. In addition, the RAM may comprise, for example, static random access memory (SRAM), dynamic random access memory (DRAM), and/or magnetic random access memory (MRAM) and other such devices. The ROM may comprise, for example, a programmable read-only memory (PROM), an erasable programmable read-only memory (EPROM), an electrically erasable programmable read-only memory (EEPROM), and/or other like memory device.

Also, the processors 403 and 413 may represent multiple processors, and the memories 406 and 416 may represent multiple memories that operate in parallel processing circuits, respectively. In such a case, the local interfaces 409 and 419 may be an appropriate network 109 (FIG. 1) that facilitates communication between any two of the multiple processors 403 and 413, and/or between any two of the memories 406 and 416, etc. The local interfaces 409 and 419 may comprise additional systems designed to coordinate this communication, including, for example, performing load balancing. The processors 403 and 413 may be of electrical and/or of some other available construction.

Although the authentication service 135, the enterprise application service 124, and other various systems described herein may be embodied in software and/or code executed by general purpose hardware as discussed above, as an alternative the same may also be embodied in dedicated hardware and/or a combination of software/general purpose hardware and dedicated hardware. If embodied in dedicated hardware, each can be implemented as a circuit and/or state machine that employs any one of and/or a combination of a number of technologies. These technologies may include, but are not limited to, discrete logic circuits having logic gates for implementing various logic functions upon an application of at least one data signal, application specific integrated circuits having appropriate logic gates, and/or other components, etc.

Figure 5:
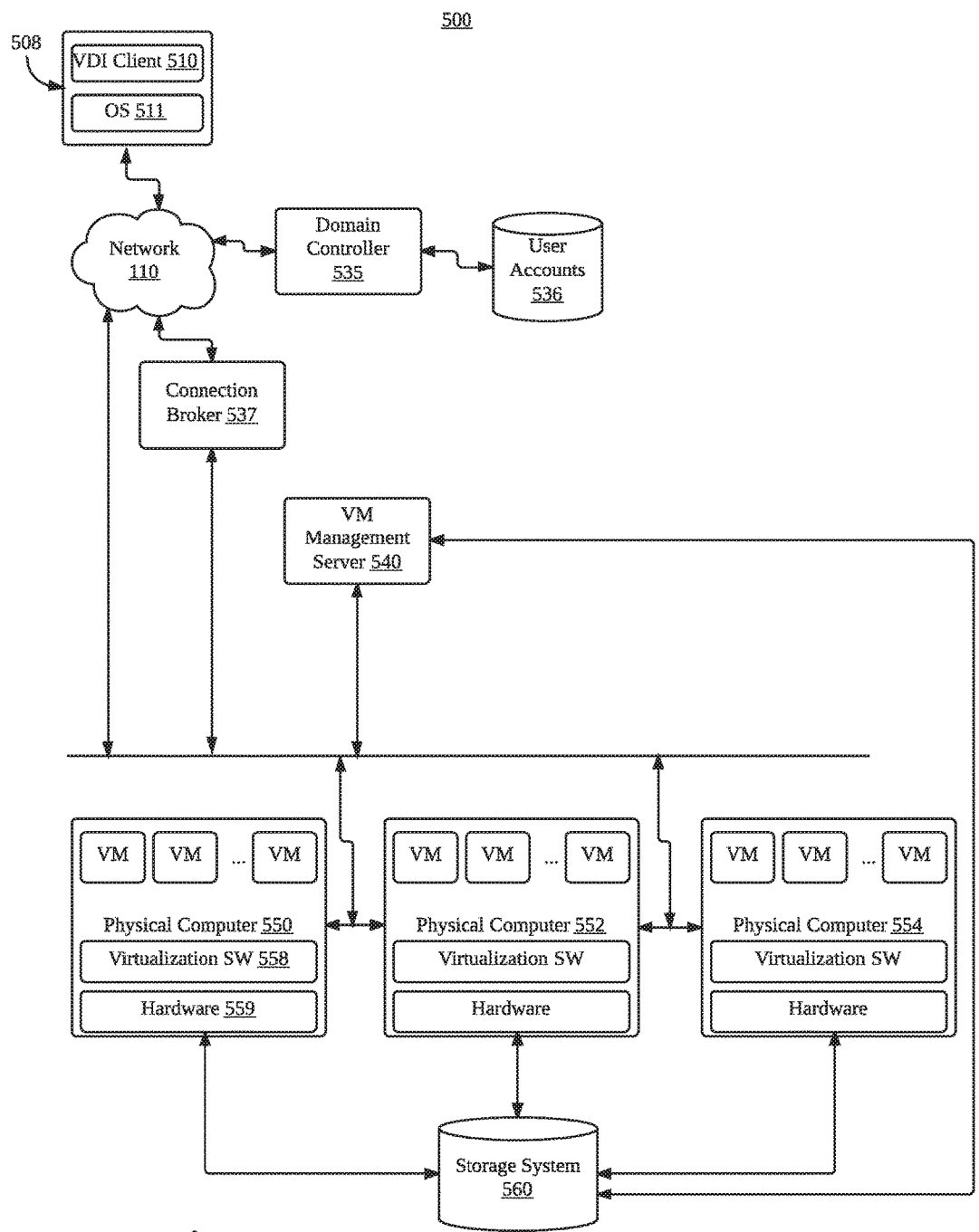
FIG. 5 illustrates components of a virtual desktop infrastructure (VDI) system in which embodiments of the present disclosure may be implemented.

FIG. 5 illustrates components of a virtual desktop infrastructure (VDI) system 500 in which embodiments of the present disclosure may be implemented. In VDI system 500, VDI client software programs such as VDI client 510, run on operating systems of local computing devices, e.g., client machine 508 on top of an operating system (OS) 511. VDI clients provides an interface for the users to access their desktops, which may be running in one of virtual machines 557 or blade server (not shown) in a data center that is remote from the users' locations. The term "desktop" may refer to the instance of an interactive operating environment provided by a computer operating system and software applications, typically in the form of a display and sound output and keyboard and mouse input. With VDI clients, users can access desktops running in a remote data center through network 110, from any location, using a general purpose computer running a commodity operating system and a VDI client software program such as VMware® View, or a special purpose thin client such as those available from Dell, HP, NEC, Sun Microsystems, Wyse, and others.

VDI system 500 may include a domain controller 535, such as Microsoft® Active Directory® that manages user accounts 536 including user log-in information, and a connection broker 537 that manages connections between VDI clients and desktops running in virtual machines 557 or other platforms. Domain controller 535 and connection broker 537 may run on separate servers or in separate virtual machines running on the same server or different servers. In the embodiments of the present disclosure illustrated herein, desktops are running in virtual machines 557 are instantiated on a plurality of physical computers 550, 552, 554, each of which includes virtualization software 558 and hardware 559. Physical computes 550, 552, 554 may be cant rolled by a virtual machine management server 540, and be coupled to a shared persistent storage system 560.

All of the components of VDI system 500 communicate via network 110. For simplicity, a single network is shown but it should be recognized that, in actual implementations, the components of VDI system 500 may be connected over the same network or different networks. Furthermore, a particular configuration of the virtualized desktop infrastructure is described above and illustrated in FIG. 5, but it should be recognized that one or more embodiments of the present disclosure may be practiced with other configurations of the virtualized desktop infrastructure.

The embodiments and functionalities described herein may operate via a multitude of computing systems, including wired and wireless computing systems, mobile computing systems (e.g., mobile telephones, tablet or slate type computers, laptop computers, etc.). In addition, the embodiments and functionalities described herein may operate over distributed systems, where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of this disclosure may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like. The Figures above and their associated descriptions provide a discussion of a variety of operating environments in which embodiments of this disclosure may be practiced. However, the devices and systems illustrated and discussed with respect to the Figures are for purposes of example and illustration and are not limiting of a vast number of computing device configurations that may be utilized for practicing embodiments of this disclosure as described herein.

The term computer readable media as used herein may include computer storage media. Computer storage media may include volatile and nonvolatile, removable and non-removable media implemented in any method or technology for storage of information, such as computer readable instructions, data structures, program modules, or other data. System memory, removable storage, and non-removable storage are all computer storage media examples (i.e., memory storage.) Computer storage media may include, but is not limited to, RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other medium which can be used to store.

The term computer readable media as used herein may also include communication media. Communication media may be embodied by computer readable instructions, data structures, program modules, non-transitory media, and/or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

A number of applications and data files may be used to perform processes and/or methods as described above. The aforementioned processes are examples, and a processing unit may perform other processes. Other programming modules that may be used in accordance with embodiments of this disclosure may include electronic mail, calendar, and contacts applications, data processing applications, word processing applications, spreadsheet applications, database applications, slide presentation applications, drawing or computer-aided application programs, etc.

Generally, consistent with embodiments of this disclosure, program modules may include routines, programs, components, data structures, and other types of structures that may perform particular tasks or that may implement particular abstract data types. Moreover, embodiments of the disclosure may be practiced with other computer system configurations, including hand-held devices, multiprocessor systems, microprocessor-based or programmable consumer electronics, minicomputers, mainframe computers, and the like. Embodiments of this disclosure may also be practiced in distributed computing environments where tasks are performed by remote processing devices that are linked through a communications network. In a distributed computing environment, program modules may be located in both local and remote memory storage devices.

Furthermore, embodiments of this disclosure may be practiced in an electrical circuit comprising discrete electronic elements, packaged or integrated electronic chips containing logic gates, a circuit utilizing a microprocessor, or on a single chip containing electronic elements or microprocessors. Embodiments of this disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of this disclosure may, for example, be implemented as a computer process and/or method, a computing system, an apparatus, device, or appliance, and/or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Embodiments of this disclosure may be practiced via a system-on-a-chip (SOC) where each and/or many of the elements described above may be integrated onto a single integrated circuit. Such an SOC device may include one or more processing units, graphics units, communications units, system virtualization units and various application functionalities, all of which may be integrated (or "burned") onto the chip substrate as a single integrated circuit. When operating via an SOC, the functionality, described herein, with respect to training and/or interacting with any element may operate via application-specific logic integrated with other components of the computing device/system on the single integrated circuit (chip).

Embodiments of this disclosure are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Further, the disclosed methods' stages may be modified in any manner, including by reordering stages and/or inserting or deleting stages, without departing from the disclosure.

All rights including copyrights in the code included herein are vested in and the property of the Assignee. The Assignee retains and reserves all rights in the code included herein, and grants permission to reproduce the material only in connection with reproduction of the granted patent and for no other purpose.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. An apparatus comprising:
   a memory store; and
   a processor coupled to the memory store, wherein the processor is configured to:
      generate a security certificate comprising a public key and a private key in response to a request to retrieve a plurality of resources that require decryption;
      store the public key in a shared segment of the memory store;
      retrieve a signed version of the public key from the shared segment of the memory store;
      retrieve a plurality encrypted of resources that are encrypted according to the public key, the plurality of encrypted resources comprising a completed delivery of the requested plurality of resources; and
      decrypt the plurality of encrypted resources according to the private key.

2. The apparatus of claim 1, wherein the request to retrieve the plurality of resources cannot be completed because the plurality of resources comprises a plurality of secure resources.

3. The apparatus of claim 1, wherein the security certificate comprises a one-time use security certificate.

4. The apparatus of claim 1, wherein the processor is further configured to store a second private key for re-use.

5. The apparatus of claim 4, wherein the processor is further configured to:
   encrypt the second private key according to the public key; and
   store the second private key in the shared segment of the memory store.

6. A non-transitory computer readable medium comprising program code that, when executed, performs stages comprising:
   generating a security certificate comprising a public key and a first private key in response to a request to retrieve a plurality of resources that require decryption;
   storing the public key in a shared segment of a memory store;
   retrieving a second private key from the shared segment of the memory store, wherein the second private key is encrypted according to the public key;
   decrypting the second private key according to the first private key;
   retrieving a plurality of encrypted data, wherein the plurality of encrypted data comprises a completed delivery of the requested plurality of resources; and
   decrypting the plurality of encrypted data according to the decrypted second private key.

7. The non-transitory computer readable medium of claim 6, wherein the stages further comprise storing the second private key in a second segment of the memory store, and wherein the second segment of the memory store comprises a restricted access segment of the memory store.

8. The non-transitory computer readable medium of claim 7, wherein access to the restricted access segment of the memory store is limited to a plurality of managed applications.

9. The non-transitory computer readable medium of claim 7, wherein the plurality of managed applications each have access to the security certificate.

10. The non-transitory computer readable medium of claim 7, wherein the shared segment of the memory store is located over a network from a client device that requests a resource and is accessible by a remote server that provides the plurality of encrypted data.

11. The non-transitory computer readable medium of claim 7, the stages further comprising:
requesting a resource from a remote server, wherein the request includes a unique identifier of the security certificate that the remote server uses to determine which of a plurality of public keys to use in creating the plurality of encrypted data.

12. A method for encrypted resource access by managed applications, comprising:
generating a security certificate comprising a public key and a private key in response to a request to retrieve a plurality of resources that require decryption;
storing the public key in a shared segment of a memory store;
retrieving a signed version of the public key from the shared segment of the memory store;
retrieving a plurality of encrypted resources that are encrypted according to the public key, the plurality of encrypted resources comprising a completed delivery of the requested plurality of resources; and
decrypting the plurality of encrypted resources according to the private key.

13. The method of claim 12, wherein the request to retrieve the plurality of resources cannot be completed because the plurality of resources comprises a plurality of secure resources.

14. The method of claim 12, wherein the security certificate comprises a one-time use security certificate.

15. The method of claim 12, further comprising storing the private key for re-use by a client device, wherein multiple managed applications use the private key.

16. The method of claim 15, wherein the shared segment of a memory store is located over a network from the client device, wherein the client device that executes a managed application that requests a resource from the plurality of resources and is accessible by a remote server that provides the resource.

* * * * *